US006788038B1

(12) United States Patent
Bell et al.

(10) Patent No.: US 6,788,038 B1
(45) Date of Patent: Sep. 7, 2004

(54) APPARATUS AND METHOD FOR DEACTIVATING AN ON-SWITCH OF A CIRCUIT FOR A VARIABLE TIME INTERVAL

(75) Inventors: Robert Henry Bell, Chandler, AZ (US); Steven Michael Barrow, Gilbert, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 35 days.

(21) Appl. No.: 10/354,911

(22) Filed: Jan. 29, 2003

(51) Int. Cl.[7] ................................................ G05F 1/40
(52) U.S. Cl. ....................................................... 323/284
(58) Field of Search ............................... 323/282, 283, 323/284, 285, 351

(56) References Cited

U.S. PATENT DOCUMENTS

| | | | | |
|---|---|---|---|---|
| 3,978,393 A | * | 8/1976 | Wisner et al. ............... | 323/272 |
| 4,346,343 A | * | 8/1982 | Berndlmaier et al. ....... | 323/282 |
| 4,425,612 A | * | 1/1984 | Bahler et al. ............ | 363/21.13 |
| 4,652,809 A | * | 3/1987 | Barn .......................... | 323/282 |
| 5,192,906 A | * | 3/1993 | Nathan ....................... | 323/284 |
| 6,504,349 B2 | * | 1/2003 | Jaworski ..................... | 323/280 |
| 6,661,679 B1 | * | 12/2003 | Yang et al. .................... | 363/41 |

OTHER PUBLICATIONS

"LM3485 Hysteretic PFET Buck Controller," National Semiconductor Corporation, Jan. 2002, 2 pages.

* cited by examiner

Primary Examiner—Adolf Berhane
(74) Attorney, Agent, or Firm—Brett A. Hertzberg; Merchant & Gould P.C.

(57) ABSTRACT

A pulse frequency modulation switching regulator varies the forced off-time of a load circuit when the load circuit is subject to an overload or short circuit event. An on-switch of the circuit is deactivated for a variable time interval when an output current of the load circuit exceeds a threshold. The time interval that the on-switch is deactivated is dependent on an output voltage of the load circuit. The on-switch is deactivated for a short time interval when the load circuit is subject to a slight overload. The on-switch is deactivated for a long time interval when the load circuit is subject to a short circuit.

16 Claims, 6 Drawing Sheets

APPARATUS AND METHOD FOR DEACTIVATING AN ON-SWITCH OF A CIRCUIT FOR A VARIABLE TIME INTERVAL

FIELD OF THE INVENTION

The present invention relates to a switch mode power supply controller. More particularly, the present invention relates to a pulse frequency modulation switching regulator that deactivates an on-switch of a load circuit for a variable time interval to protect the load circuit from short circuit and overload conditions.

BACKGROUND OF THE INVENTION

Figure 1:
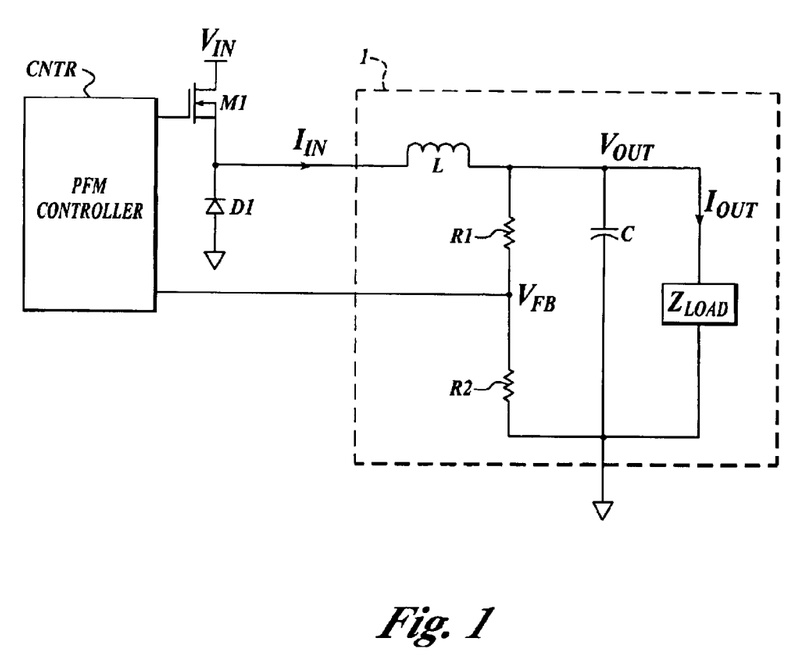
FIG. 1 is a schematic diagram of a conventional regulated circuit.

A pulse frequency modulation (PFM) switching regulator regulates a load by activating an on-switch when an output voltage is at or below a voltage regulation setpoint and by deactivating the on-switch after a fixed period of time or when the output voltage exceeds the voltage regulation setpoint. FIG. 1 shows a conventional switching regulator. During normal operation, a PFM controller (CNTR) activates an on-switch (M1) and an input current ($I_{IN}$) flows into a load circuit (1). The input current ($I_{IN}$) energizes an inductor (L), and a capacitor (C) is charged to an output voltage ($V_{OUT}$). The output voltage is provided to a load ($Z_{LOAD}$) which draws an output current ($I_{OUT}$). Two resistors (R1, R2) are configured as a voltage divider to sense the output voltage ($V_{OUT}$). The PFM controller (CNTR) is responsive to a feedback voltage ($V_{FB}$) from the voltage divider.

An excessive output current ($I_{OUT}$) can damage the load ($Z_{LOAD}$). The output current ($I_{OUT}$) may exceed a current limit due to a short circuit or overload event at the load ($Z_{LOAD}$). The PFM controller (CNTR) deactivates the on-switch (M1) for a fixed time interval (e.g., 9 microseconds) when the output current ($I_{OUT}$) exceeds the current limit. A diode (D1) is activated each time the on-switch (M1) is deactivated. The diode (D1) is a freewheeling diode that conducts to provide continuous input current ($I_{IN}$) to the load circuit (1). Deactivation of the on-switch (M1) causes the energy stored in the inductor (L) to dissipate. The energy dissipation in the inductor (L) causes the input current ($I_{IN}$) to linearly decrease while the on-switch (M1) is deactivated. The decrease in the input current ($I_{IN}$) allows the load ($Z_{LOAD}$) to recover from the short circuit or overload event. The on-switch (M1) activates and the diode (D1) deactivates after the fixed time interval has elapsed.

SUMMARY OF THE INVENTION

This summary of the invention section is intended to introduce the reader to aspects of the invention. Particular aspects of the invention are pointed out in other sections herein below, and the invention is set forth in the appended claims, which alone demarcate its scope.

The present invention is directed to an apparatus for providing a limit signal when a current provided to a load circuit by an on-switch exceeds a threshold. The apparatus comprises a current limit time control circuit, a current sense circuit, and a time adjustment circuit. The current limit time control circuit asserts the limit signal for a variable time interval when activated. The current sense circuit activates the current limit time control circuit when the current exceeds the threshold. The time adjustment circuit adjusts the variable time interval in response to an output voltage associated with the load circuit.

Another aspect of the invention is directed to a method for providing a limit signal when a current provided to a load circuit by an on-switch exceeds a threshold. The method comprises sensing the current, activating a time control circuit when the sensed current exceeds the threshold, providing the limit signal for a variable time interval when the time control circuit is activated, and adjusting the variable time interval in response to an output voltage associated with the load circuit.

Still another aspect of the invention is directed to an apparatus for providing a limit signal when a current provided to a load circuit by an on-switch exceeds a threshold. The apparatus comprises a means sensing the current, a means for activating a time control circuit when the sensed current exceeds the threshold, a means for providing the limit signal for a variable time interval when the time control circuit is activated, and means for adjusting the variable time interval in response to an output voltage associated with the load circuit.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on".

Figure 2:
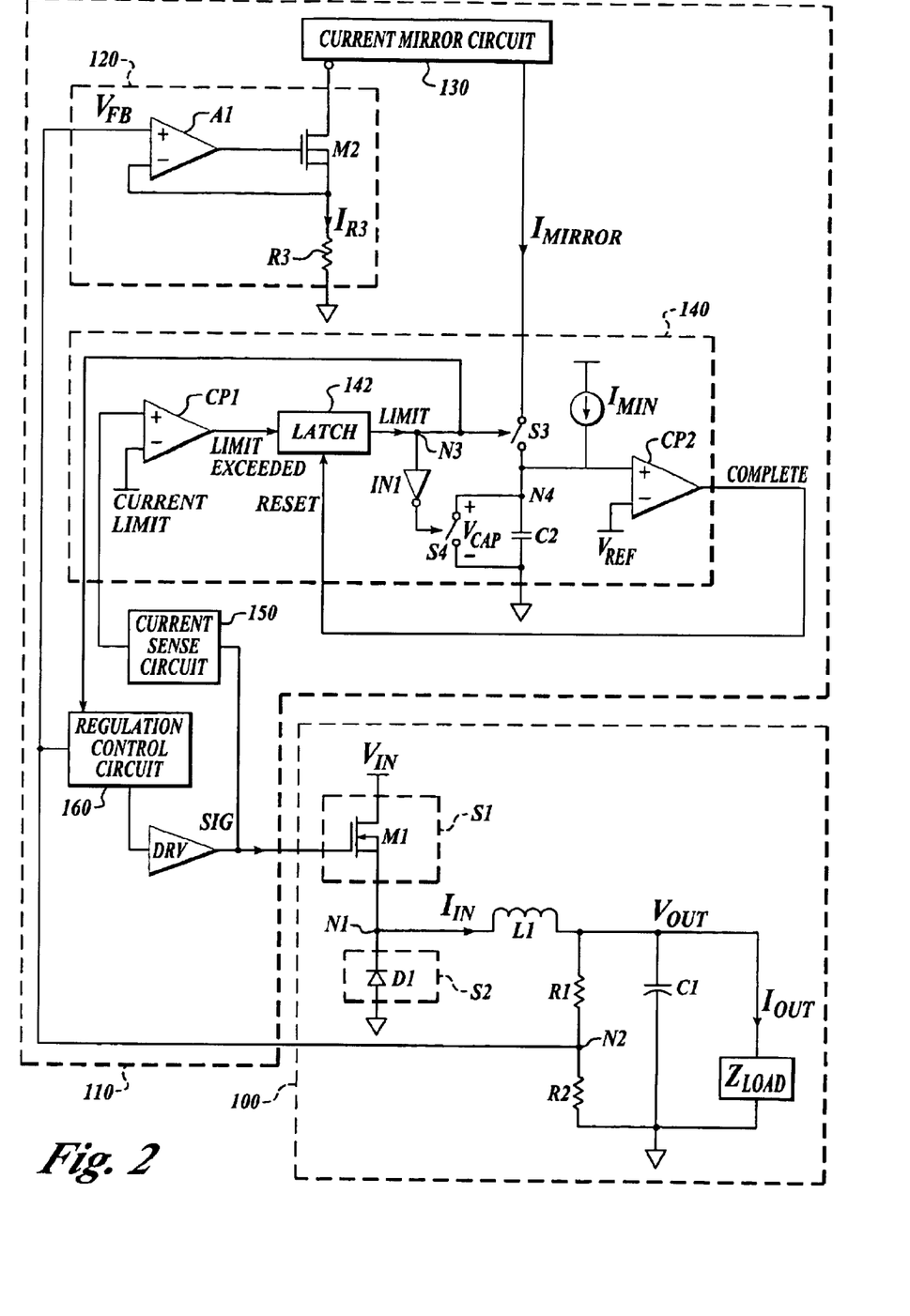
FIG. 2 is a schematic diagram of a load circuit and a pulse frequency modulation switching regulator that deactivates an on-switch of the load circuit for a variable time interval.

FIG. 2 is a schematic diagram of a load circuit (100) and an exemplary pulse frequency modulation (PFM) switching regulator (110) that deactivates an on-switch (S1) of the load circuit (100) to protect the load circuit (100) from short circuit and overload conditions. The on-switch (S1) of the load circuit (100) is deactivated for a variable time interval when an output current ($I_{OUT}$) of the load circuit (100) exceeds a threshold. The time interval that the on-switch (S1) is deactivated is dependent on an output voltage ($V_{OUT}$) of the load circuit (100). The on-switch (S1) is deactivated for a short time interval when the load circuit (100) is subject to a slight overload ($V_{OUT}$ close to setpoint). The on-switch (S1) is deactivated for a long time interval when the load circuit (100) is subject to a short circuit ($V_{OUT}$ close to circuit ground).

The PFM switching regulator (110) includes a time adjustment circuit (120), a current mirror circuit (130), a current limit time control circuit (140), a current sense circuit (150), a regulation control circuit (160), and a driver (DRV). The driver (DRV) is coupled between the load circuit (100) and the regulation control circuit (160). The load circuit (100) is coupled to the time adjustment circuit (120). The time adjustment circuit (120) is coupled to the current mirror circuit (130). The current mirror circuit (130) is coupled to the current limit time control circuit (140). The current limit time control circuit (140) is coupled to the current sense circuit (150). The current sense circuit (150) is coupled to the load circuit (100). The regulation control circuit (160) is coupled to the time adjustment circuit (120) and is responsive to a LIMIT signal from the current limit time control circuit (140).

The load circuit (100) includes an on-switch (S1), an off-switch (S2), an inductor (L1), two resistors (R1, R2), a capacitor (C1), and a load ($Z_{LOAD}$). The on-switch (S1) can be represented by a field effect transistor (M1). The off-switch (S2) can be represented by a diode (D1). The gate of transistor M1 is coupled to an output of the driver (DRV). The source of transistor M1 is coupled to an input voltage ($V_{IN}$). The drain of transistor M1 is coupled to node N1. The cathode of diode D1 is coupled to node N1. The anode of diode D1 is coupled to ground. The inductor (L1) is coupled between node N1 and an output voltage ($V_{OUT}$). The load ($Z_{LOAD}$) is coupled between the output voltage ($V_{OUT}$) and ground. The capacitor (C1) is coupled between the output voltage ($V_{OUT}$) and ground. The resistor (R1) is coupled between the output voltage ($V_{OUT}$) and node N2. The resistor (R2) is coupled between node N2 and ground.

In operation, the driver (DRV) activates the transistor (M1), which provides an input current ($I_{IN}$) to energize the inductor (L1). The load ($Z_{LOAD}$) draws an output current ($I_{OUT}$). The capacitor (C1) is charged to the output voltage ($V_{OUT}$) which is provided to the load ($Z_{LOAD}$). The output is said to be within regulation when the output voltage ($V_{OUT}$) is equal to a target operating voltage. The output current ($I_{OUT}$) exceeds a current limit if the load ($Z_{LOAD}$) is over loaded or short-circuited. The resistors (R1, R2) are configured as a voltage divider to sense the output voltage ($V_{OUT}$). The voltage divider generates a feedback voltage ($V_{FB}$) at node N2. The PFM switching regulator (110) is responsive to the feedback voltage ($V_{FB}$).

The time adjustment circuit (120) is a voltage-to-current converter and comprises an amplifier (A1), a field effect transistor (M2), and a resistor (R3). The non-inverting input of the amplifier (A1) is coupled to node N2. The gate of transistor M2 is coupled to the output of the amplifier (A1). The source of transistor M2 is coupled to the resistor (R3). The resistor (R3) is coupled to ground. The inverting input of the amplifier (A1) is coupled to the resistor (R3). The drain of transistor M2 is coupled to the current mirror circuit (130).

The feedback voltage ($V_{FB}$) from the load circuit (100) causes the amplifier (A1) to activate the transistor (M2) when the output current ($I_{OUT}$) exceeds the current limit. A shunt current ($I_{R3}$) flowing through the resistor (R3) varies in proportion to the feedback voltage ($V_{FB}$). The proportional relationship between the feedback voltage ($V_{FB}$) and the shunt current ($I_{R3}$) is represented by the equation $I_{R3}=V_{FB}/R_3$, i.e., a low feedback voltage ($V_{FB}$) results in a low shunt current ($I_{R3}$).

The shunt current ($I_{R3}$) is mirrored by the current mirror circuit (130). A mirror current ($I_{MIRROR}$) flows from the current mirror circuit (130) into the current limit time control circuit (140). The mirror current ($I_{MIRROR}$) is proportional to the shunt current ($I_{R3}$) by a constant, K, that is associated with the current mirror circuit (130). The constant, K, can have any positive finite value. Thus, the mirror current ($I_{MIRROR}$) has a proportionate relationship with the feedback voltage ($V_{FB}$) as represented by the equation $I_{MIRROR}=I_{R3} \cdot K=(V_{FB}/R_3) K$, i.e., the mirror current ($I_{MIRROR}$) increases as the feedback voltage ($V_{FB}$) increases.

The current limit time control circuit (140) includes two comparators (CP1, CP2), a latch (142), an inverter (IN1), two switches (S3, S4), a capacitor (C2), and a current source ($I_{MIN}$). The non-inverting input of comparator CP1 is coupled to the current sense circuit (150). The inverting input of comparator CP1 is maintained at a current limit reference voltage that represents a current limit (e.g., 0.5 amps). The latch (142) is coupled between the output of the comparator (CP1) and node N3. The switch (S3) is coupled between the current mirror circuit (130) and node N4. The switch (S3) is actuated by the LIMIT signal from the latch (142). The input of the inverter (IN1) is coupled to node N3. The capacitor (C2) is coupled between node N4 and ground. The switch (S4) is coupled between node N4 and ground. The switch (S4) is actuated by the inverted LIMIT signal at the output of the inverter (IN1). The current source ($I_{MIN}$) is coupled to node N4. The non-inverting input of the comparator (CP2) is coupled to node N4. The inverting input of the comparator (CP2) is maintained at a reference voltage ($V_{REF}$). The output of the comparator (CP2) resets the latch (142). The regulation control circuit (160) is responsive to the LIMIT signal from the latch (142).

The output current ($I_{OUT}$) will exceed the current limit due to a short circuit or overload event at the load ($Z_{LOAD}$). As the output current ($I_{OUT}$) increases, the output voltage ($V_{OUT}$) begins to decrease resulting in a decrease in the feedback voltage ($V_{FB}$). The regulation control circuit (160) responds to the decreased feedback voltage ($V_{FB}$) and triggers the driver (DRV). The driver (DRV) maintains activation of the on-switch (S1) in an attempt to increase the output voltage ($V_{OUT}$). The current sense circuit (150) activates the comparator (CP1) in response to a high logic signal (SIG) from the driver (DRV). The comparator (CP1) outputs a LIMIT EXCEEDED signal when the output current ($I_{OUT}$) exceeds the current limit (e.g., 0.5 amps). The latch (142) outputs a high logic LIMIT signal when the comparator (CP1) is activated.

The switch (S4) is actuated while the LIMIT signal is at a low logic state (i.e., the output current ($I_{OUT}$) is less than the current limit.) The capacitor (C2) discharges while the switch (S4) is closed. The switch (S3) actuates and the switch (S4) opens when the LIMIT signal is at a high logic state (i.e., the output current ($I_{OUT}$) exceeds the current limit.) The regulation control circuit (160) responds to the LIMIT signal and triggers the driver (DRV) to deactivate the on-switch (S1).

Actuating the switch (S3) causes the mirror current ($I_{MIRROR}$) and the current source ($I_{MIN}$) to charge the capacitor (C2) to a capacitor voltage ($V_{CAP}$). The comparator (CP2) activates and outputs a COMPLETE signal when the capacitor voltage ($V_{CAP}$) increases beyond the reference voltage ($V_{REF}$). The latch (142) is reset by the COMPLETE signal. The regulation control circuit (160) triggers the driver (DRV) in response to the resetting of the latch (142) to activate the on-switch (S1). The output current ($I_{OUT}$) increases when the on-switch (S1) is activated.

The capacitor voltage ($V_{CAP}$) has a time proportionate relationship with the mirror current ($I_{MIRROR}$). A large mirror current ($I_{MIRROR}$) quickly charges the capacitor (C2) to the reference voltage ($V_{REF}$) causing the on-switch (S1) to be deactivated for a short time interval. A small mirror current ($I_{MIRROR}$) will delay how long it takes the capacitor voltage ($V_{CAP}$) to reach the reference voltage ($V_{REF}$), causing the on-switch (S1) to be deactivated for a longer time interval. A short circuit at the load ($Z_{LOAD}$) causes the on-switch (S1) to be deactivated for the longest time period. A short circuit at the load ($Z_{LOAD}$) causes the feedback voltage ($V_{FB}$) and the mirror current ($I_{MIRROR}$) to be zero. The current source ($I_{MIN}$) provides a weak current (e.g., 1 microamp) to the capacitor (C2) resulting in a long time interval before the capacitor voltage ($V_{CAP}$) reaches the reference voltage ($V_{REF}$).

Figure 3:
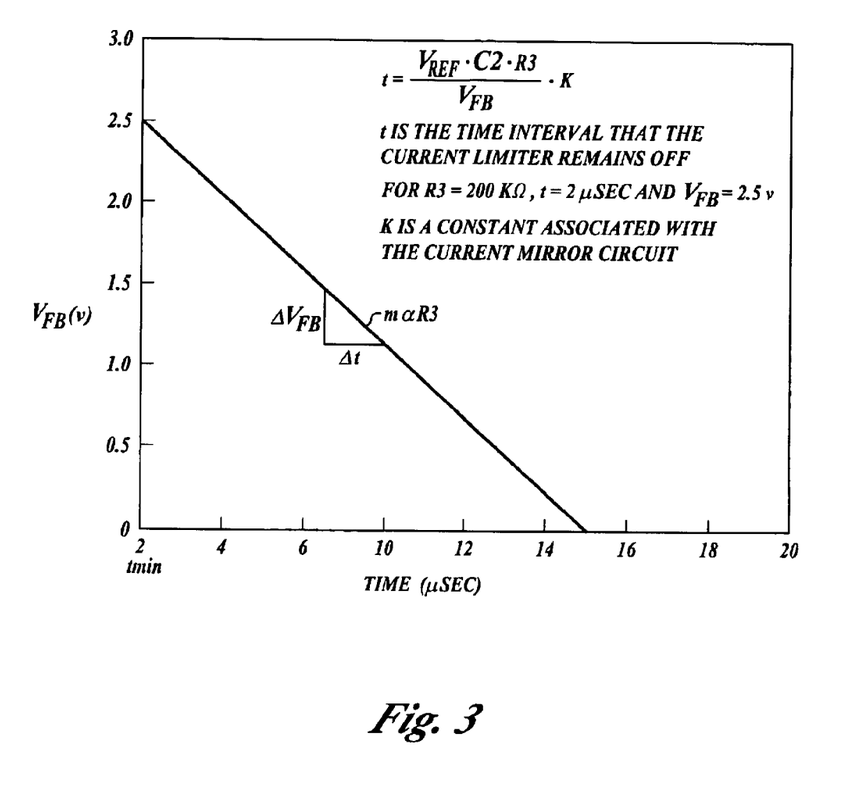
FIG. 3 is a graph illustrating the relationship between the deactivation time of the on-switch and a feedback voltage.

The value of the resistors (R1, R2, R3) are selected such that the feedback voltage ($V_{FB}$) correlates to the maximum allowable output voltage ($V_{OUT}$). FIG. 3 illustrates the proportional relationship between the time interval that the on-switch (S1) is deactivated and the feedback voltage ($V_{FB}$). The time interval that the on-switch (S1) is deactivated is inversely proportional to the feedback voltage ($V_{FB}$) and proportional to the resistance of resistor R3. The value of resistor R3 adjusts the time interval that the on-switch (S1) is deactivated while the load circuit (100) is subject to an overload or short circuit event. The value of resistor R3 is selected to give a range of time periods that the on-switch (S1) is deactivated. For example, a value of resistor R3 equal to 200 K ohms will cause the on-switch (S1) to deactivate for 2 microseconds when the feedback voltage ($V_{FB}$) is 2.5 volts. The on-switch (S1) deactivates for 15 microseconds when the load ($Z_{LOAD}$) is subject to a short circuit, i.e., the feedback voltage ($V_{FB}$) is 0 volts.

Figure 4:
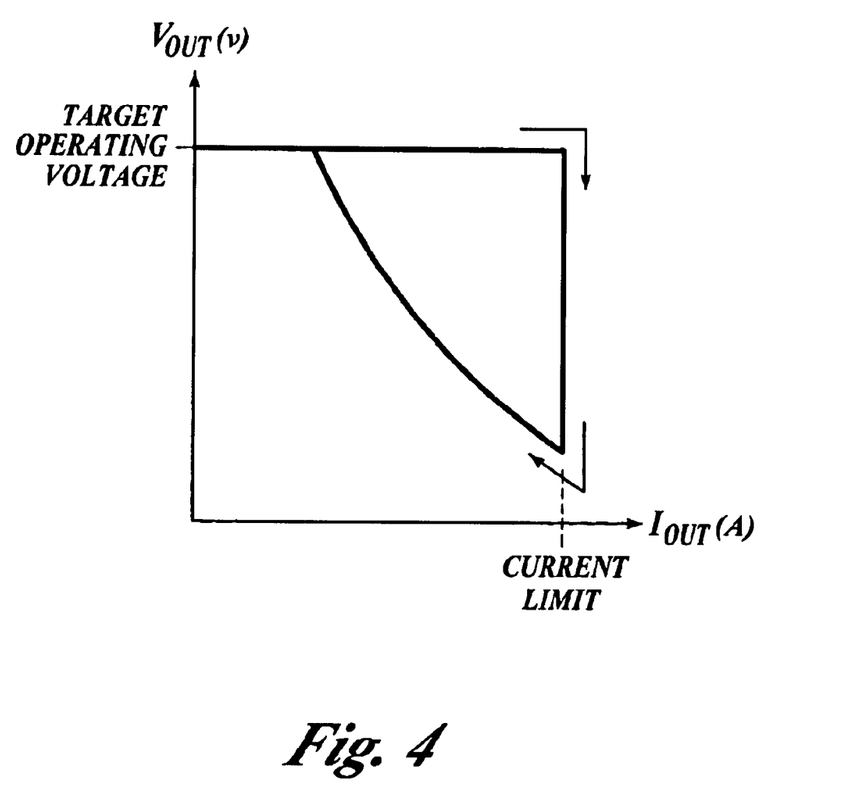
FIG. 4 is a graph illustrating the relationship between output current and output voltage of a conventional regulated circuit.

A fixed time interval of on-switch S1 deactivation results in a fold back effect in the output current ($I_{OUT}$) when the output current ($I_{OUT}$) exceeds the current limit. As shown in FIG. 4, the arrows indicate a load profile where the output current ($I_{OUT}$) is increased to the current limit threshold, then decreased until the target operating voltage is once again reached. Increasing the output current ($I_{OUT}$) beyond the current limit threshold causes the output voltage ($V_{OUT}$) to drop dramatically. In order to reach the target voltage again, following the over-current event, the output current ($I_{OUT}$) must be reduced significantly below the current limit threshold. The amount of foldback can be quantified as the difference between the current limit threshold and the reduced current level required to reach the target operating voltage following a current limit event.

Figure 5:
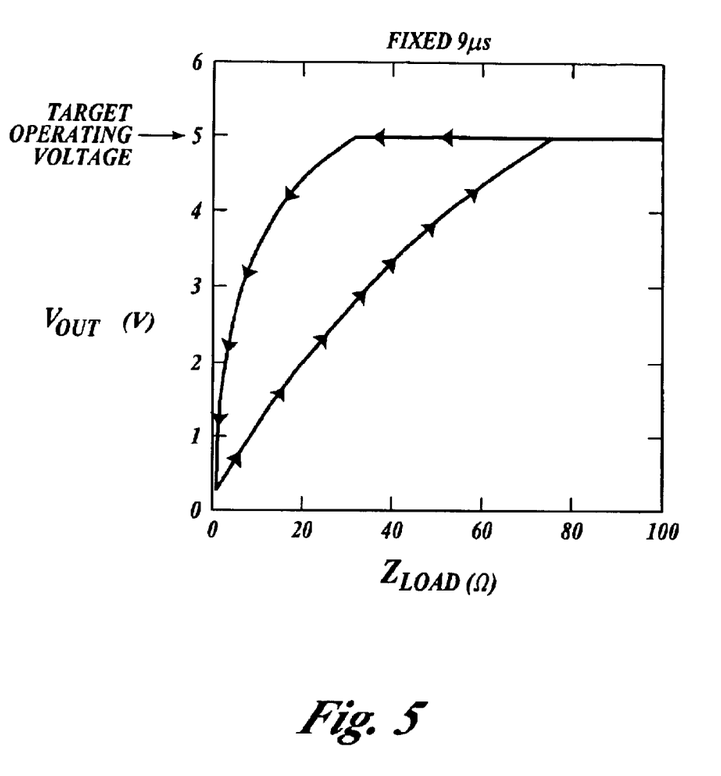
FIG. 5 is a graph illustrating the relationship between a load and an output voltage of the load circuit, where overload protection is implemented with a fixed switch deactivation time (9 $\mu$S)

FIG. 5 illustrates the relationship between the output voltage ($V_{OUT}$) and the load ($Z_{LOAD}$) when the on-switch (S1) is deactivated for a fixed time interval of 9 microseconds. The output voltage ($V_{OUT}$) remains at the target operating voltage (e.g., 5 volts) as the load ($Z_{LOAD}$) decreases in response to an increase in output current ($I_{OUT}$). The output voltage ($V_{OUT}$) decreases when the current limit is reached, i.e., when the load ($Z_{LOAD}$) is less than 32 ohms. The load ($Z_{LOAD}$) and the output voltage ($V_{OUT}$) increase after reaching minimum values of approximately 1 ohm and 0.25 volts, respectively. The output voltage ($V_{OUT}$) reaches the target operating voltage when the load ($Z_{LOAD}$) is increased to approximately 75 ohms. The load ($Z_{LOAD}$) must be at least 75 ohms for the PFM switching regulator (110) to provide adequate power to the load circuit (100) and reach the target operating voltage. At a lower resistive value of the load ($Z_{LOAD}$), the 9 microsecond fixed deactivation time of the on-switch (S1) may not permit the load circuit (100) to reach the target operating voltage quickly enough, or the output voltage ($V_{OUT}$) may not reach the target operating voltage at all.

Figure 6:
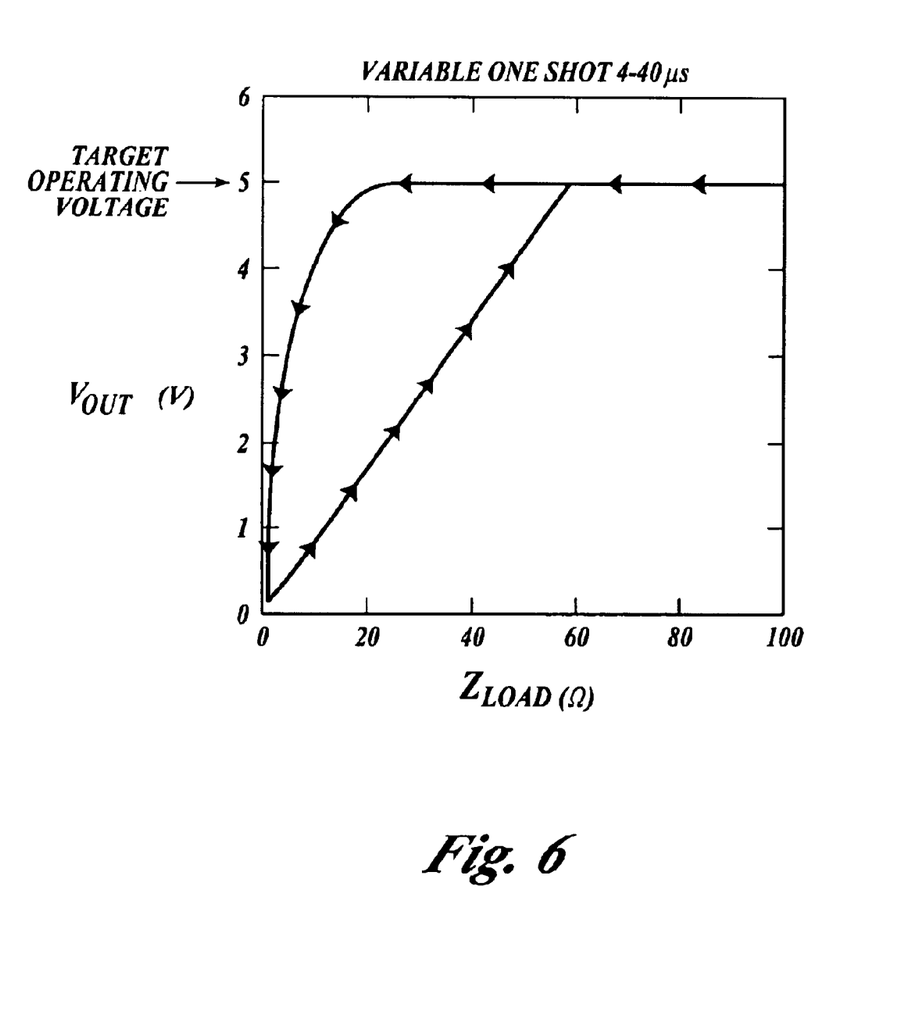
FIG. 6 is a graph illustrating the relationship between the load and the output voltage of the load circuit, where overload protection is implemented with a variable switch deactivation time (4 to 40 $\mu$S).

FIG. 6 illustrates a current limit fold back time associated with deactivating the on-switch (S1) of the load circuit (100) for a variable time interval. The on-switch (S1) is deactivated for 40 microseconds under short circuit conditions ($V_{FB}$=0). The deactivation time is reduced to 4 microseconds when the output of the load circuit (100) is subject to a slight overload. The output voltage ($V_{OUT}$) decreases when the current limit is reached, i.e., when the load ($Z_{LOAD}$) is approximately 22 ohms. The load ($Z_{LOAD}$) and output voltage ($V_{OUT}$) increase after reaching minimum values of approximately 1 ohm and 0.25 volts, respectively. The output voltage ($V_{OUT}$) reaches the target operating voltage (e.g., 5 volts) when the load ($Z_{LOAD}$) is increased to approximately 58 ohms.

The present invention varies the forced off-time of the load circuit (100) after the load ($Z_{LOAD}$) is subject to an overload or short circuit event. The output voltage ($V_{OUT}$) is not too far from the target operating voltage when the load ($Z_{LOAD}$) is subject to a slight overload. The amount of time that the on-switch (S1) is deactivated is short (e.g., less than 9 microseconds). The output voltage ($V_{OUT}$) is zero when the load ($Z_{LOAD}$) is short-circuited. The short circuit causes the feedback voltage ($V_{FB}$) to be zero. Under short circuit conditions, the on-switch (S1) of the load circuit (100) is deactivated for a long time interval (e.g., greater than 15 microseconds). Following an overload condition, the variable time that the on-switch (S1) is deactivated causes the output voltage ($V_{OUT}$) to reach the target operating voltage at a lower load resistance than a fixed deactivation time.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for providing a limit signal when a current provided by an on-switch to a load circuit exceeds a threshold, comprising:
    a current limit time control circuit that is arranged to assert the limit signal for a variable time interval when activated;
    a current sense circuit that is arranged to activate the current limit time control circuit when the current exceeds the threshold; and
    a time adjustment circuit that is arranged to adjust the variable time interval in response to an output voltage associated with the load circuit.

2. The apparatus of claim 1, wherein the limit signal is provided to a voltage regulator that is arranged to selectively activate the on-switch to regulate the output voltage.

3. The apparatus of claim 2, wherein the voltage regulator deactivates the on-switch when the limit signal is asserted.

4. The apparatus of claim 1, wherein the current limit time control circuit further comprises a capacitor that is charged when the current limit time control circuit is activated, and a comparator that is arranged to deassert the limit signal when the capacitor is charged to a reference voltage.

5. The apparatus of claim 4, wherein the capacitor accumulates charge at a rate that is proportionate to the output voltage.

6. The apparatus of claim 5, wherein the variable time interval is shorter when the output voltage is closer to a target operating voltage.

7. The apparatus of claim 4, wherein the capacitor accumulates charge at a minimum rate when the output voltage is approximately zero.

8. The apparatus of claim 4, wherein the current limit time control circuit further comprises a switch that is arranged to discharge the capacitor when the limit signal is deasserted.

9. The apparatus of claim 1, further comprising a latch that is arranged to be set when the current limit time. control circuit is activated, and that is arranged to be reset when the current limit time control circuit is deactivated.

10. A method for providing a limit signal when a current provided by an on-switch to a load circuit exceeds a threshold, comprising:
   sensing the current;
   activating a time control circuit when the sensed current exceeds the threshold;
   asserting the limit signal for a variable time interval when the time control circuit is activated; and
   adjusting the variable time interval in response to an output voltage associated with the load circuit.

11. The method of claim 10, further comprising selectively activating the on-switch to regulate the output voltage.

12. The method of claim 11, further comprising deactivating the on-switch when the limit signal is asserted.

13. The method of claim 10, further comprising charging a capacitor when the current limit time control circuit is activated, and deasserting the limit signal when the capacitor is charged to a reference voltage.

14. The method of claim 13, further comprising discharging the capacitor when the limit signal is deasserted.

15. An apparatus for providing a limit signal when a current provided by an on-switch to a load circuit exceeds a threshold, comprising:
   a means for sensing the current;
   a means for activating a time control circuit when the sensed current exceeds the threshold;
   a means for asserting the limit signal for a variable time interval when the time control circuit is activated; and
   a means for adjusting the variable time interval in response to an output voltage associated with the load circuit.

16. The apparatus of claim 15, further comprising a means for selectively activating the on-switch to regulate the output voltage in response to the limit signal.

* * * * *

UNITED STATES PATENT AND TRADEMARK OFFICE
CERTIFICATE OF CORRECTION

PATENT NO. : 6,788,038 B1
DATED : September 7, 2004
INVENTOR(S) : Bell et al.

It is certified that error appears in the above-identified patent and that said Letters Patent is hereby corrected as shown below:

Column 7,
Line 17, "time. control" should read -- time control --

Signed and Sealed this

Twelfth Day of April, 2005

JON W. DUDAS
*Director of the United States Patent and Trademark Office*